A. N. ROSE.
WATER COOLER.
APPLICATION FILED FEB. 21, 1903.
Reissued Aug. 22, 1911. 13,286.
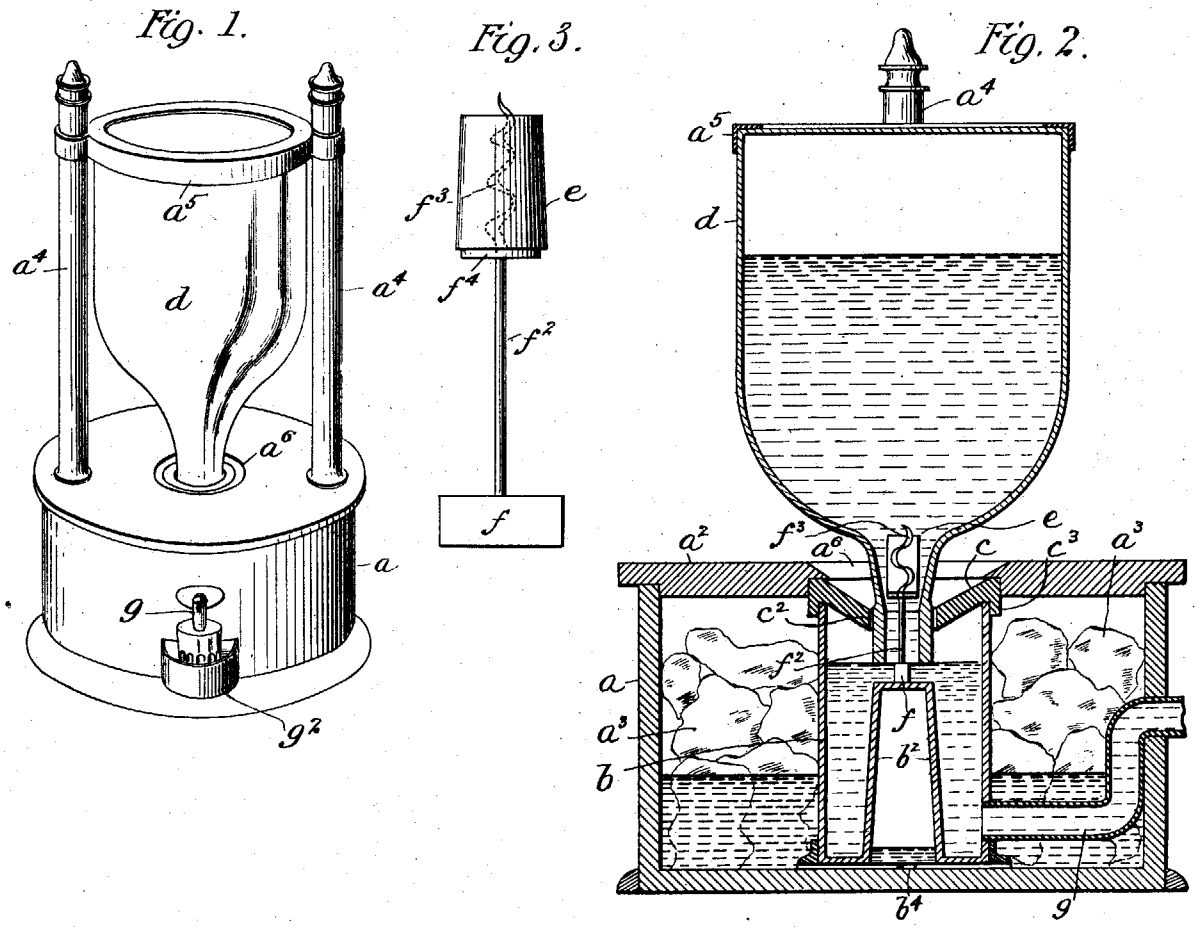
Witnesses
Frank S. Ober
L. V. Sparks
Inventor
Alonzo N. Rose
By his Attorney
Willis Fowler

UNITED STATES PATENT OFFICE.

ALONZO N. ROSE, OF NEW YORK, N. Y.

WATER-COOLER.

13,286. Specification of Reissued Letters Patent. Reissued Aug. 22, 1911.

Original No. 715,609, dated December 9, 1902, Serial No. 99,997. Application for reissue filed February 21, 1903. Serial No. 144,534.

*To all whom it may concern:*

Be it known that I, ALONZO N. ROSE, a citizen of the United States, residing at New York, in the county of New York and State of New York, have invented certain new and useful Improvements in Water-Coolers, of which the following is a full and complete specification, such as will enable those skilled in the art to which it appertains to make and use the same.

The object of this invention is to provide a water-cooler designed for use in connection with demijohns or large bottles containing water which it is designed to cool for drinking purposes; and with this and other objects in view the invention consists in a device of the class specified constructed as hereinafter described and claimed.

The invention is fully disclosed in the following specification, of which the accompanying drawings form a part, in which the separate parts of my improvement are designated by the same reference characters in each of the views, and in which—

Figure 1 is a perspective view of my improved water-cooler; Fig. 2, a sectional side elevation thereof, and Fig. 3, a side elevation of a bottle cork or stopper which I employ.

In the practice of my invention I provide a base-receptacle $a$, which is preferably cylindrical in form in cross-section, and said receptacle is provided with a cover $a^2$, which may be secured thereto or connected therewith in any desired manner; but in practice this connection between the cover $a^2$ and the base receptacle $a$ is such that said cover may be raised or opened in the operation of placing ice in the base-receptacle, the ice being indicated at $a^3$ in Fig. 2.

Within the receptacle $a$ and centrally thereof is placed a supplemental casing or receptacle $b$, the bottom portion of which is provided with an upwardly-directed member $b^2$, which extends to within a predetermined distance from the top of said receptacle $b$ and around which the water is free to circulate in said receptacle, and said member $b^2$ is open at the bottom, and the receptacle $b$ is provided at the bottom with radial passages $b^4$, whereby the water in the base-receptacle $a$ is free to circulate beneath the bottom of the receptacle $b$ and rise in the central portion thereof formed by the part $b^2$. It will, however, be observed that the cooling water or agent from the communicating base-receptacle $a$, cannot rise in the part $b^2$ to the same level as it can in the receptacle $a$, owing to the fact that the air is trapped or pocketed in the part $b^2$ above the water as it rises therein, as is indicated in Fig. 2, while at the same time this body of air being held under pressure is maintained at about the temperature of the cooling-agent and in this condition it is kept in contact with the walls of the part or recess $b^2$.

The cover $a^2$ is provided with standards $a^4$, on which is mounted a vertically-movable ring $a^5$, which is L-shaped in cross-section, and said cover is also provided with a central opening $a^6$, beneath which is placed a cover $c$ of the central receptacle $b$.

The body portion of the cover $c$ of the receptacle $b$ is conical in form, and the apex thereof is directed downwardly and provided with a central opening $c^2$, and said cover is also provided with an annular flange or rim $c^3$, by which it is held in place on the receptacle $b$, and the central opening $c^2$ therein is directly over the top of the raised part or member $b^2$ on the bottom of the receptacle $b$.

My improved cooler is designed for the purpose of cooling water contained in demijohns or large bottles, one of which is shown at $d$ in Figs. 1 and 2, and in practice I employ a stopper for a demijohn or bottle which is of the usual form, as shown at $e$; but in connection with this stopper I employ an ordinary cork-screw or similar device consisting of a handle portion $f$ and a shank $f^2$, connected therewith, said shank being provided with the usual spiral end member $f^3$. In practice the neck of the demijohn or bottle is closed by the cork $e$ in the usual manner, and whenever it is desired to cool the water in said demijohn or bottle as drinking-water the ring or band $a^5$ is raised on the standards $a^4$ and the demijohn or bottle is placed in the position shown in Figs. 1 and 2, in which operation the handle $f$ of the cork-screw attachment with which the cork $e$ is provided passes downwardly through the cover $c$ of the supplemental or inner casing $b$ and strikes the top of the central raised portion $b^2$ of the bottom thereof, and the cork is forced upwardly into the neck of the bottle or demijohn, as shown in Fig. 2, and in this same operation the ring or band $a^5$ is lowered, so that it rests on the inverted upper end of the bottle or demijohn and holds the same in an upright position. When the parts are in the position shown in Fig. 2 and the cork $e$ has been forced inwardly into the bottle or demijohn, the water will flow out into the central or inner casing $b$ and rise therein to a level with the mouth of the bottle, as indicated in Fig. 2, when it will seal the bottle and no more water will flow therefrom until the level of the water in the casing $b$ has been lowered by drawing some of the water therefrom.

It will be understood that the base-casing $a$ is filled with ice, as indicated in Fig. 2 and as hereinbefore described, and the central casing or receptacle $b$ is provided at one side and near the bottom thereof with a draw-off pipe $g$, which extends outwardly through the side of the base-casing $a$ and which is provided with a faucet or similar device in the usual manner, and said base-casing is also preferably provided with a glass or cup holder $g^2$.

My invention is not limited in any way to the cork-screw attachment of the cork $e$, and any suitable means or devices may be provided in connection with said cork which will operate in the same manner, the only object in this connection being to provide suitable means or devices in connection with the cork whereby when the demijohn or bottle is inverted and placed in the position shown in Fig. 2 the said means or devices will operate, in connection with the central raised portion $b^2$ of the inner casing $b$, to force the stopper upwardly or into the demijohn bottle.

It will be understood, of course, that the water cannot rise in the inner casing $b$ higher than indicated in Fig. 2 by reason of the fact that the mouth of the bottle is closed, and it will also be understood that the cork-screw may be connected with stopper $e$ at any time, and by preference this is preferably done just before the bottle is placed in position on the base of the cooler, and the shank $f^2$ of the cork-screw is preferably provided with a disk or plate $f^4$, and when the cork-screw is screwed into the cork and placed in the position shown in Fig. 2 the handle of the cork-screw strikes the central raised portion $b^2$ of the casing $b$, as hereinbefore described, and the weight of the demijohn rests on the handle $f$ of the cork-screw, which in turn rests on the central portion $b^2$ of the casing $b$, and the water is free to flow out through the neck of the demijohn at the opposite sides of the handle of the cork-screw.

This device is simple in construction and operation and perfectly adapted to accomplish the result for which it is intended and may be used wherever devices of this class are required, and changes in and modifications of the construction described may be made without departing from the spirit of my invention or sacrificing its advantages.

Having fully described my invention, what I claim as new, and desire to secure by Letters Patent, is—

1. A device for delivering and cooling water, the same consisting in the combination of a cooling-chamber adapted to contain a cooling agent, a water-receptacle upon which said cooling agent acts to cool the contents thereof, the said water-receptacle being provided with an inwardly directed part or recess communicating with said cooling chamber and serving to retain a body of air in contact with the walls of said part or recess and also with said cooling agent to constitute said body of air as a cooling means, and means for drawing water from said receptacle, substantially as and for the purpose set forth.

2. A device for delivering and cooling water, the same consisting in the combination of a cooling-chamber adapted to contain a cooling agent, a water-receptacle upon which said cooling agent acts to cool the contents thereof, the said water-receptacle being provided with an inwardly directed part or recess communicating with said cooling chamber and serving to retain a body of air in contact with the walls of said part or recess and also with said cooling agent to constitute said body of air as a cooling means, a bottle placed with its open mouth projecting downwardly into said water-receptacle, and means for drawing water for use from said water-receptacle, whereby successive portions of the water in the bottle are automatically delivered to said water-receptacle and cooled therein, such delivery taking place at times determined by the drawing of water from said water-receptacle for use, substantially as and for the purpose set forth.

3. A device for delivering and cooling bottled water, the same consisting in the combination of a water-receptacle and means for cooling the contents thereof, a bottle placed with its open mouth projecting downwardly into said water-receptacle in position to be sealed by the water in said receptacle when said water rises therein to substantially the level of the mouth of the bottle to stop the flow therefrom and to be un-sealed by said water when its level is lowered in said receptacle and thereby replenish the latter, the water containing portion of said receptacle lying below the level of the mouth of the bottle having less capacity than the bottle which supplies it and having an inwardly directed part constituting an increased area for the cooling medium to act upon, and means for drawing water for use from said water-receptacle, whereby successive portions of the water in the bottle are automatically delivered to said water-receptacle and cooled therein, such delivery taking place at times determined by the drawing of water from said receptacle for use, substantially as and for the purpose set forth.

4. A device for delivering and cooling water, the same consisting in the combination of a cooling-chamber adapted to contain a cooling agent, a water-receptacle upon which said cooling agent acts to cool the contents thereof, and means for retaining a body of air in contact with said cooling agent and with a part of said water-receptacle and maintaining such air under the pressure of the cooling agent, such as ice, and its meltage, substantially as and for the purpose set forth.

5. The combination of a cooling-chamber, a water-receptacle having an inwardly-directed part or member leading from the cooling-chamber and confining the air therein, a bottle placed with its open mouth projecting downwardly into said water-receptacle, a stopper for the mouth of said bottle, and means operated by contact with said inwardly-directed part or member for opening the said bottle-stopper when the bottle is placed in inverted position, substantially as and for the purpose set forth.

6. A device for delivering and cooling bottled water, the same consisting in the combination of a water-receptacle having an inwardly directed part providing upon the interior a substantially annular or similar shaped chamber and upon the exterior means for retaining a body of air in contact with said receptacle and the cooling agent, a cooling-chamber in which said water-receptacle is placed so that the cooling agent may act upon the water-containing portion of said water-receptacle and said body of air, a bottle placed with its open mouth projecting downwardly into said water-receptacle in position to be sealed by the water in said receptacle when said water rises therein substantially to the level of the mouth of the bottle and to be unsealed by said water when its level is lowered in said receptacle, and means for drawing water for use from said water-receptacle, whereby successive portions of the water in the bottle are automatically delivered to said water-receptacle and cooled therein, such delivery taking place at times determined by the drawing of the water from said water-receptacle for use, substantially as and for the purpose set forth.

In testimony that I claim the foregoing as my invention I have signed my name, in presence of the subscribing witnesses, this 16th day of February, 1903.

ALONZO N. ROSE.

Witnesses:
LINZEE BLAGDEN,
ERNEST B. CRESAP.

Copies of this patent may be obtained for five cents each, by addressing the "Commissioner of Patents, Washington, D. C."